United States Patent [19]

Williams et al.

[11] Patent Number: 5,865,154

[45] Date of Patent: Feb. 2, 1999

[54] AUXILIARY BRAKE CONTROL

[76] Inventors: Frank Williams; Crystal Williams, both of 3508 Cascade Hwy. NE., Silverton, Oreg. 97381

[21] Appl. No.: 798,712

[22] Filed: Feb. 12, 1997

[51] Int. Cl.⁶ .................................................. F02D 13/04
[52] U.S. Cl. ........................................ 123/322; 477/165
[58] Field of Search ................................. 123/322, 320, 123/321; 477/34, 118, 165

[56] References Cited

U.S. PATENT DOCUMENTS

| | | | |
|---|---|---|---|
| 2,026,220 | 12/1935 | Denker | 192/4 |
| 3,220,392 | 11/1965 | Cummins | 123/97 |
| 3,525,317 | 8/1970 | Muir | 123/97 |
| 3,786,792 | 1/1974 | Pelizzoni et al. | 123/97 B |
| 4,742,806 | 5/1988 | Tart, Jr. et al. | 123/322 |
| 5,088,348 | 2/1992 | Hiramuki | 74/859 |
| 5,315,900 | 5/1994 | Teeter | 477/165 |
| 5,357,444 | 10/1994 | Ishiguro et al. | 364/426.01 |
| 5,733,219 | 3/1998 | Rettig et al. | 123/322 |

*Primary Examiner*—Thomas N. Moulis
*Attorney, Agent, or Firm*—Miller Nash Wiener Hager & Carlsen

[57] ABSTRACT

The invention is a device consisting of a control module that allows a driver to electronically activate a truck's engine brakes. The brakes are activated by use of a push-button switch installed on the truck's gearshift lever. In the first embodiment of the invention, when the button is pressed and released, the control module's electronic circuitry keeps the engine brakes engaged until the clutch or throttle is used. In the second embodiment of the invention, the brakes also can be turned off by pressing the button again. The invention eliminates the need to use a truck's standard, dashboard-mounted manual switch to activate the engine brake and allows the driver to intermittently turn the engine brakes on or off.

6 Claims, 8 Drawing Sheets

AUXILIARY BRAKE CONTROL

BACKGROUND OF THE INVENTION

This invention relates to the operation of engine brakes, commonly known as "jake brakes" or "engine retarders" and more particularly, to an auxiliary brake control to operate engine brakes.

BACKGROUND INFORMATION

Trucks in use today are heavy and carry massive loads. Consequently, a substantial braking effort can be required in order to slow down or stop a truck, especially when the truck is being driven on descending roadways or in heavy traffic. While descending along a sloping road, the driver must apply continuous braking pressure to slow down the moving vehicle or else risk a run-away truck and highway accident. Additionally, when driving in heavy traffic, the driver needs to apply intermittent braking to slow down or stop the truck. In these situations, insufficient or delayed braking pressure may cause a collision with other vehicles.

A truck's standard chassis brakes acting at the wheels are usually sufficient to provide the requisite braking pressure. However, additional braking power is sometimes required or convenient. Accordingly, engine brakes, sometimes called "engine compression brakes", "exhaust brakes", "jake brakes", or "engine retarders" are used in trucks to supplement the vehicles' existing braking systems. Jake brakes are the subject of numerous patents. Basically, these brakes operate by turning the power-producing operation of the engine into a power-dissipating operation. In other words, when the jake brakes are applied, the air compressed within the combustion chambers are vented into the exhaust manifold, and this release of compressed gases dissipates vehicle energy, serving to slow down the truck.

Another type of engine brake operates through the use of an apparatus inserted into the exhaust stream of the engine. This apparatus causes an increase in the resistance to the flow of exhaust gases, and the increased resistance causes the engine to operate like a pump, thereby dissipating vehicle energy.

To control the level of braking strength, many trucks are equipped with a three-position selector switch. The minimum setting vents only two of the engine's cylinders when the jake brakes are applied. At the strongest setting, six cylinders are relieved of their compressed gases, resulting in maximum braking power.

Jake brakes are usually activated by an on-off switch located on the truck's dashboard. The switch is manually operated and cumbersome, because it requires the driver to remove his hands from the steering wheel or gearshift lever in order to arm or disarm the jake brakes. Furthermore, the manual switch makes it difficult to intermittently activate and deactivate the jake brakes when in heavy traffic. What is needed is a means to conveniently turn the jake brakes on and off within the normal operation of the truck.

Several methods have been designed to conveniently control the activation and deactivation of a truck's jake brakes. Relevant prior art is disclosed in U.S. Pat. No. 4,742,806 to Tart, Jr., entitled "Auxiliary Engine Brake System," issued May 10, 1988. This prior art discloses an actuating button installed on a gearshift knob. This button must be pressed and held down to keep the engine brakes activated. When the button is released by lifting the finger off the button, the jake brakes are deactivated. This system is as cumbersome as the conventional dashboard switch in that the driver needs to physically hold down the button to keep the jake brakes activated while concurrently using the steering wheel or the gearshift lever.

The present invention solves the above problems by providing a convenient and instantaneous way to electronically arm and disarm the jake brakes with the push of a button, thus increasing the level of safety in the operation of the truck. The driver will no longer have to remove his hands from the steering wheel or gearshift lever for extended periods of time, because a control button installed on or in the gearshift knob takes the place of the dashboard-mounted switch. Unlike the Tart, Jr. patent, the present invention allows the driver to remove his finger from the control button, and the jake brakes will stay activated until the clutch or throttle is depressed, at which time the jake brakes will remain deactivated until the button is depressed again. In a second embodiment of the invention, the jake brakes can be intermittently turned on or off by repeatedly pressing the button. The invention is available in a simple, easy-to-install retrofit kit, thereby dispensing with any need for major reconstruction or modification of existing jake brake systems. Moreover, the invention can be installed in trucks having either mechanically controlled or computer-controlled engines.

SUMMARY OF THE INVENTION

While gearshift knob switches have been used in the past for activating and deactivating engine brakes ("jake brakes") in conjunction with solenoid-operated relays, power to the solenoid was controlled entirely by the knob switch. In the present invention, power to the relay is initially supplied by the switch, but thereafter is "picked" in an "on" condition independently of subsequent switch actions.

In accordance with the invention, a finger switch is mounted to a vehicle gearshift having a jake brake system. To activate the system, the finger switch is pressed by a vehicle operator which closes a switch contact. Preferably, the finger switch is no more than a releasable button that is pressed and held to close the contact.

When the switch contact is closed, it causes electrical current to be supplied to a solenoid-operated relay which, in turn, causes electrical current to be transmitted through a control circuit for the purpose of activating operation of the jake brakes. In accordance with the invention, at the same time, a separate power feed is activated which is also connected to the solenoid-operated relay. The separate power feed operates independently of the finger switch. Consequently, in the case of a push-button switch, when the button is released and the switch contact broken, the solenoid-operated relay remains "activated" or "on"—in an unchanged state because it continues to receive electrical current from the separate power feed.

In one embodiment of the invention, the separate power feed is not broken until electrical current in the control circuit is broken by another switch in the circuit. By way of example, the other switch could be a dashboard switch, clutch switch, throttle switch, or any other switch serially connected in the control circuit such that it is capable of breaking the power supplied to the jake brakes.

As mentioned above, the finger switch may be a push-button switch that makes an electrical contact only for as long as it is pressed or held by the finger or hand of the vehicle operator. The independent power feed to the solenoid-operated relay enables the operator to simply push and release the switch button and thereafter remove his or her hand from the gearshift in order to continue driving the vehicle while the jake brakes operate. This will continue until the operator depresses the clutch or throttle or activates a master switch on the dashboard control panel of the vehicle.

In the second embodiment of the invention, the solenoid-operated relay is similarly held "on" by a separate power feed. However, the separate feed is only partially independent of switch operation. The second embodiment utilizes a state-changing flip-flop which changes state every time the finger switch is activated (or pressed). For example, the first time the finger switch is pressed and released (thereby making and breaking the switch contact), the separate power feed maintains solenoid-operated relay so that continued operation of the system is enabled. This continues until a separate switch in the control circuit is operated to deactivate the brakes as described above or, in the alternative, the finger switch is pressed a second time. Pressing the finger switch again causes the flip-flop to alter its state. The separate power feed is responsive to this change and breaks power to the relay, thereby breaking the control circuit and deactivating the brakes.

To summarize the differences between the first and second embodiments, in the first embodiment, the finger switch may be used only to activate the brakes. Deactivation is accomplished by another switch. In the second embodiment, the finger switch may be used to both activate and deactivate the brakes (in addition to activation or deactivation by other switches).

It is to be understood that the words and terms used in this document are to be given their plain and ordinary meaning unless an express statement is made indicating otherwise. It is impossible to anticipate improvements that may be made to the invention. The term "finger switch" means any kind of switch capable of performing the function described in this document. "Gearshift" means the gearshift knob or shaft or an equivalent structure. "Control circuit" or "jake brake system control circuit" means an electrical circuit that may consist of many discrete parts or combinations of circuitry so long as, as a whole, the control circuit is capable of either creating a signal that results in jake brake operation or otherwise controls the power necessary to activate and operate the system. The term "solenoid-operated relay" should be understandable by anyone knowledgeable in the field. It need not be physically located near the finger switch in order to perform the function described above. The two terms "hold" or "press" relative to operation of the finger switch should be taken as meaning more or less the same thing.

The invention will become better understood upon reading the description which follows.

BRIEF DESCRIPTION OF THE DRAWINGS

In the drawings, like reference numerals refer to like parts throughout the various views unless specifically indicated otherwise, and wherein.

The labels and wire colors shown in the drawings are for illustrative purposes only, serving as a guide to aid in understanding the invention and are in no way intended to limit or restrict the scope of the invention.

BEST MODE FOR CARRYING OUT THE INVENTION

Figure 9:
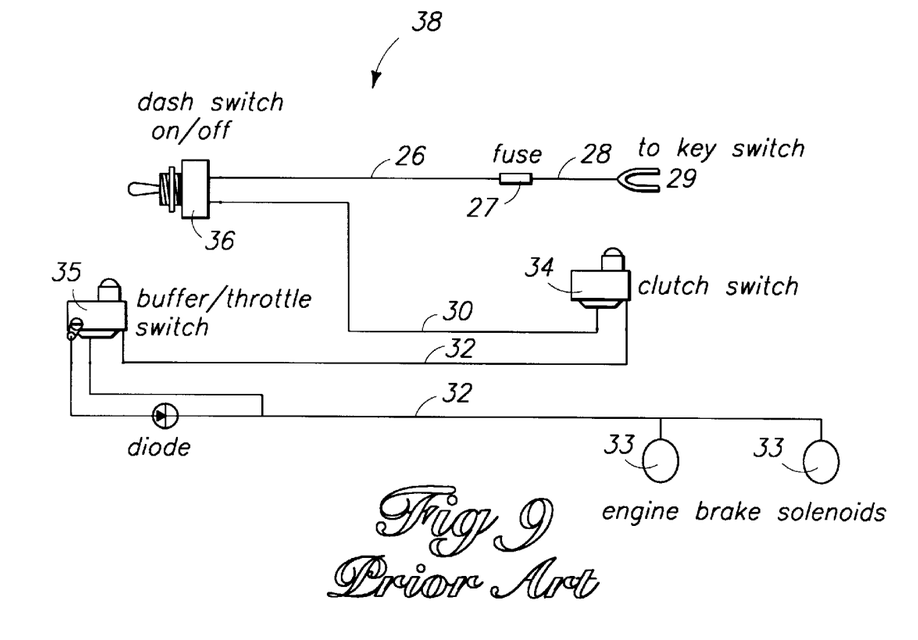
FIG. 9 is a schematic illustrative of the prior art.

Referring now to the drawings, FIG. 9 shows the prior art—a conventional jake brake system, shown generally at 38, where a dashboard-mounted, on-off switch 36 is connected by lead 26 to fuse or breaker 27. This in turn is connected by lead 28 to the ignition switch and a 12-volt battery 29. The dashboard-mounted switch 36 is connected in series with a clutch switch 34, throttle switch 35, and then to the engine brake solenoids 33 by leads 30, 31, and 32 respectively. The clutch switch 34 and the throttle switch 35 are normally closed, opening only when the throttle or clutch pedals are pushed. The basic properties and operation of this type of system are well known in the art and will not be described here in further detail.

Still referring to FIG. 9, the operation of the prior art system is fairly simple. When the dashboard-mounted switch 36 is placed in the "on" position to activate the jake brakes, a complete electrical circuit is formed in the series connection between ground (not shown), battery 29, switch 36, clutch switch 34, throttle switch 35, and the engine brake solenoids 33. To deactivate the jake brakes, the circuit can be broken by turning the dashboard-mounted switch 36 to the "off" position, by pushing on the clutch so as to open the clutch switch 34, or by pushing on the throttle pedal so as to open the throttle switch 35.

Figure 1:
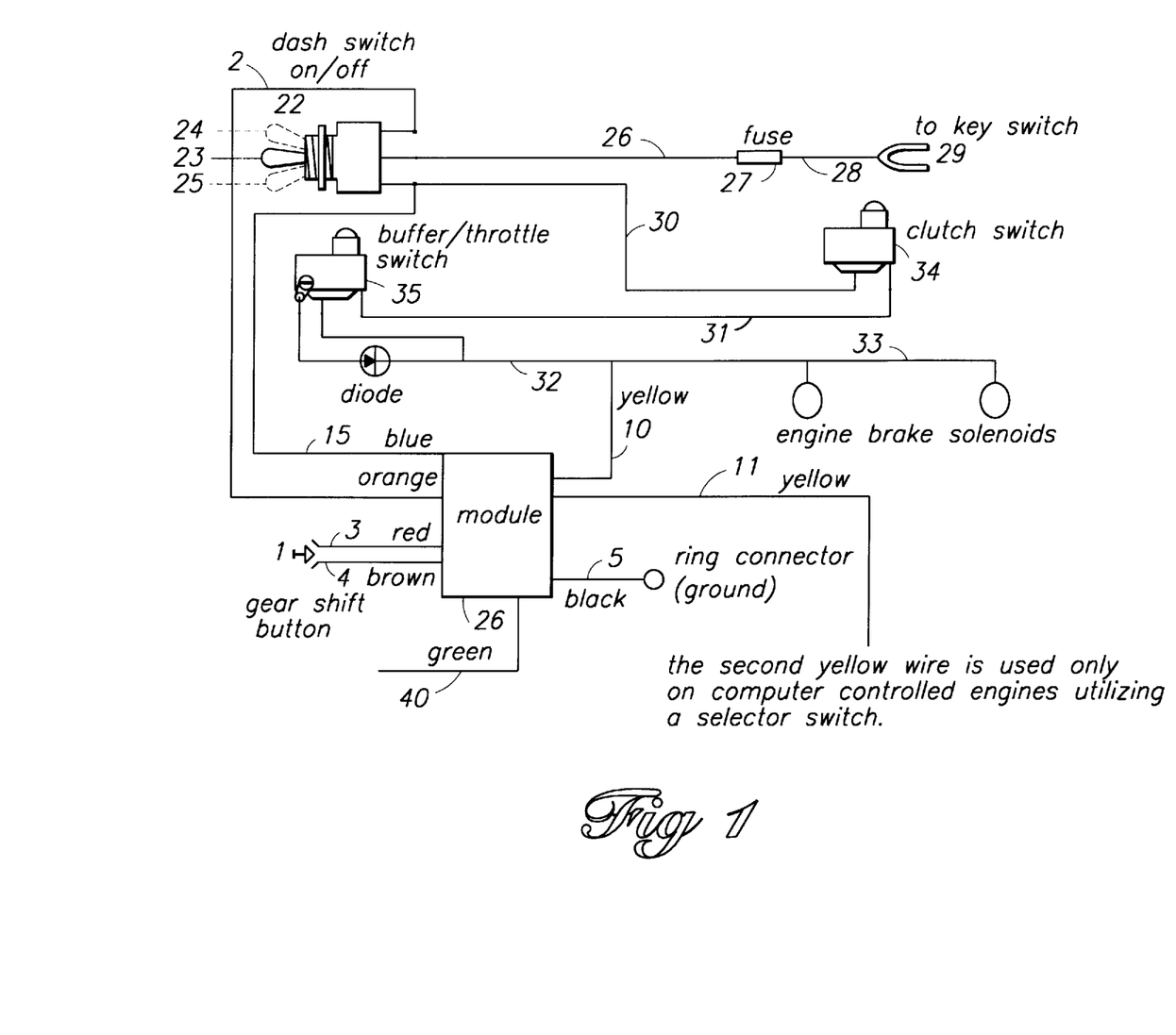
FIG. 1 is a schematic showing a control module in accordance with the invention connected to a jake brake control system. A replacement three-position dashboard switch is shown, along with throttle and clutch switches.

Referring now to FIG. 1, the present invention is designed to be installed or retrofitted into the existing jake brake system 38 shown in FIG. 9. The dashboard-mounted, on-off switch 36 is replaced by a three-position switch 22. The invention's control module 16 (which is further described below) is connected to the system 38 by attaching lead 15 to lead 30, lead 2 to the three-position switch 22, and lead 10 to lead 32. Lead 11, in most cases, is used only on computer-controlled engines utilizing a selector switch 37 (See FIG. 8 and FIG. 10) but may have use in some other application. Lead 40 is unused.

Figure 2:
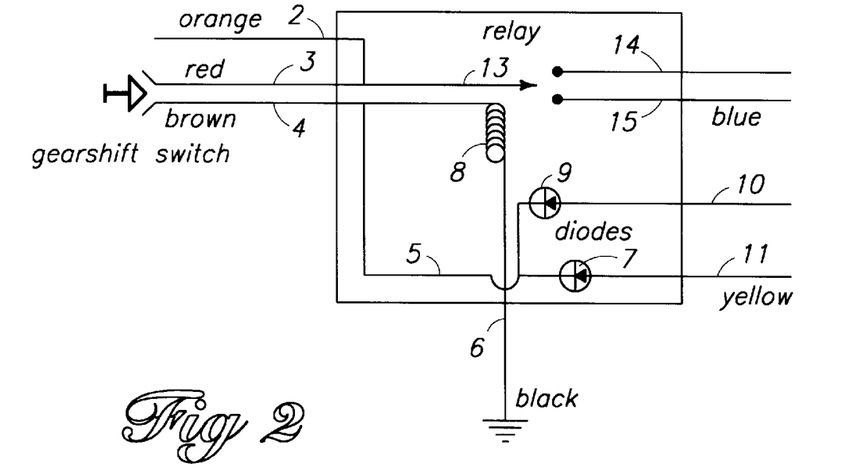
FIG. 2 is a schematic of the control module shown in FIG. 1.

The details of control module 16 and its associated lead connections are shown in FIG. 2. The control module consists of a normally open relay contact 15 and a normally closed contact 14. Contact 13 may be connected to lead 14 if the relay is not activated, or to lead 15 if it is activated. The other end of contact 13 is connected to leads 2 and 3. Lead 3 is connected to push-button switch 1. One end of coil 8 is connected to ground by lead 6, and the other end of coil 8 is connected by lead 4 to push-button switch 1. Lead 5 connects lead 4 to one end of diodes 7 and 9. The other ends of diodes 7 and 9 are connected to leads 10 and 11 respectively.

Figure 4:
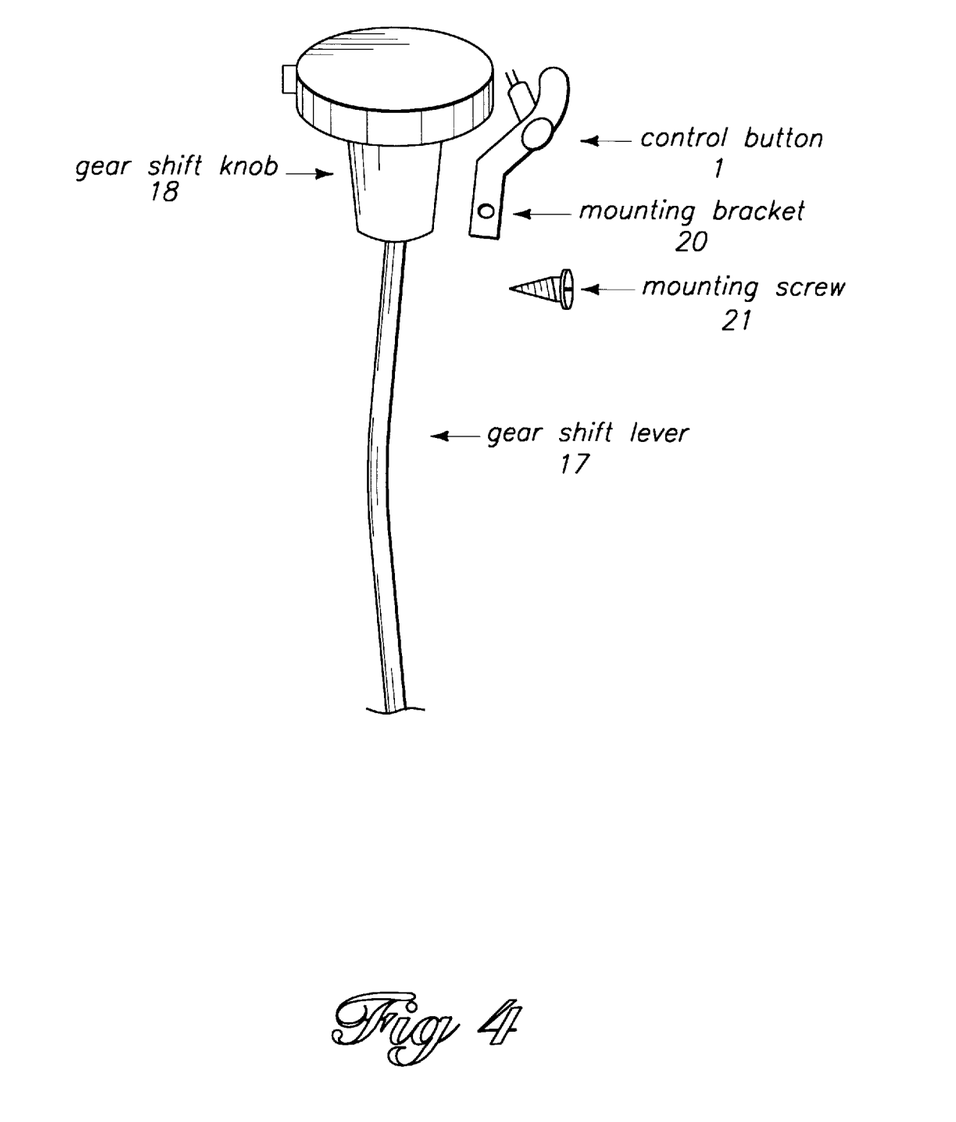
FIG. 4 shows a gearshift lever and how the invention's push-button switch is mounted on the gearshift knob.

FIG. 4 shows the push-button switch 1 mounted on the knob 18 of gearshift lever 17. Push-button switch 1 is easily installed on any conventional knob 18 and gearshift lever 17 by use of a mounting bracket 20 and a screw 21.

The connection shown in FIG. 1 allows the driver to utilize both the existing engine jake system 38 described above and the present invention. Referring now to FIG. 1 and FIG. 2, when the three-position switch 22 is in "middle" position 23, the engine brakes are turned off. When switch 22 is in the "up" position 24 and the jake brakes are turned on, the system functions as if a conventional dashboard-mounted on-off switch 36, like that shown in FIG. 9, was in place and turned to the "on" position. In such a position, an energized circuit is formed by the series connection of the battery 29, the three-position switch 22, the closed clutch switch 34, the closed throttle switch 35, and the engine brake solenoids 33. As before, the circuit can be de-energized, thereby turning off the jake brakes, by placing the three-position switch 22 in the "middle" position 23, or by opening the clutch switch 34 or the throttle switch 35 (by engaging the clutch or throttle pedals, respectively).

Note that when the three-position switch 22 is in the "up" position 24, pressing the push-button switch 1 on the gearshift lever 17 to activate the jake brakes will have no effect, as the jake brakes are already on.

If the clutch or throttle switches 34 and 35 were to open while the three-position switch 22 is in the "up" position 24, jake brake operation will be deactivated until both the clutch and throttle switches 34 and 35 are again closed. If the three-position switch 22 is in the "middle" position 23 and then the push-button switch 1 is pressed, nothing will happen as there is no current being supplied in lead 2.

Now the invention will be described when the three-position switch 22 is in the "down" position 25. When the switch 22 is in this position, voltage is supplied to leads 2 and 3, but as of yet, the jake brakes are not activated because no current is flowing in leads 30 and 15. When the push-button switch 1 is pressed to close the switch contact, current will flow from lead 2 to lead 3, and then to lead 4. Coil 8 will then energize and cause contact 13 to close to contact 15. When contact 13 closes, current will flow through lead 15 and into the series connection of closed clutch switch 34 and closed throttle switch 35, and into the engine brake solenoids 33 on mechanically controlled engines. On computer-controlled engines, like that shown in FIG. 8, current will flow from the battery 29, through leads 3 and 4, through the control module 16 (energizing coil 8 and causing contact 13 to close to contact 15) thereby completing the enable circuit on the electronic engine control module 59. The jake brakes will then activate if the clutch switch 34 and the throttle switch 35 are both closed. Current will also flow into leads 10 and 11, through diodes 7 and 9, and into coil 8. This continuous flow of current back into coil 8 creates a magnetic force that will keep contact 13 closed, eliminating the need to hold down push-button switch 1 in order to keep the jake brakes on. In other words, simply pressing and releasing the push-button switch 1 will engage the jake brakes and keep them engaged.

Again, returning the three-position switch 22 to the "middle" position 23 also will turn the engine brakes off, as position 23 de-energizes the circuit by dropping voltage on lead 2. The engine brakes can also be turned off by depressing the clutch or throttle, thereby opening clutch switch 34 or throttle switch 35 respectively to drop current through diodes 7 and 9. The brakes will then remain off until push-button switch 1 is pressed again.

The diodes 7 and 9 serve two very important purposes. First, they prevent any current in the leads 10 and 11 from activating the engine brake solenoids 33 if the push-button switch 1 is pressed while the clutch and throttle switches 34 and 35 are open, i.e. when the clutch or throttle are depressed. If the diodes 7 and 9 were not present and the push-button switch 1 was pressed to turn on the jake brakes in this situation, current will flow from lead 3 to lead 4, and then to leads 10 and 11 and into the engine brake solenoids 33, possibly causing damage to the engine. Placing the diodes 7 and 9 in the circuit will prevent any current from traveling through leads 10 and 11 and into the engine brake solenoids 33. Second, diodes 7 and 9 allow current to flow into coil 8 to keep contact 13 closed until the throttle or clutch is depressed.

Figure 3:
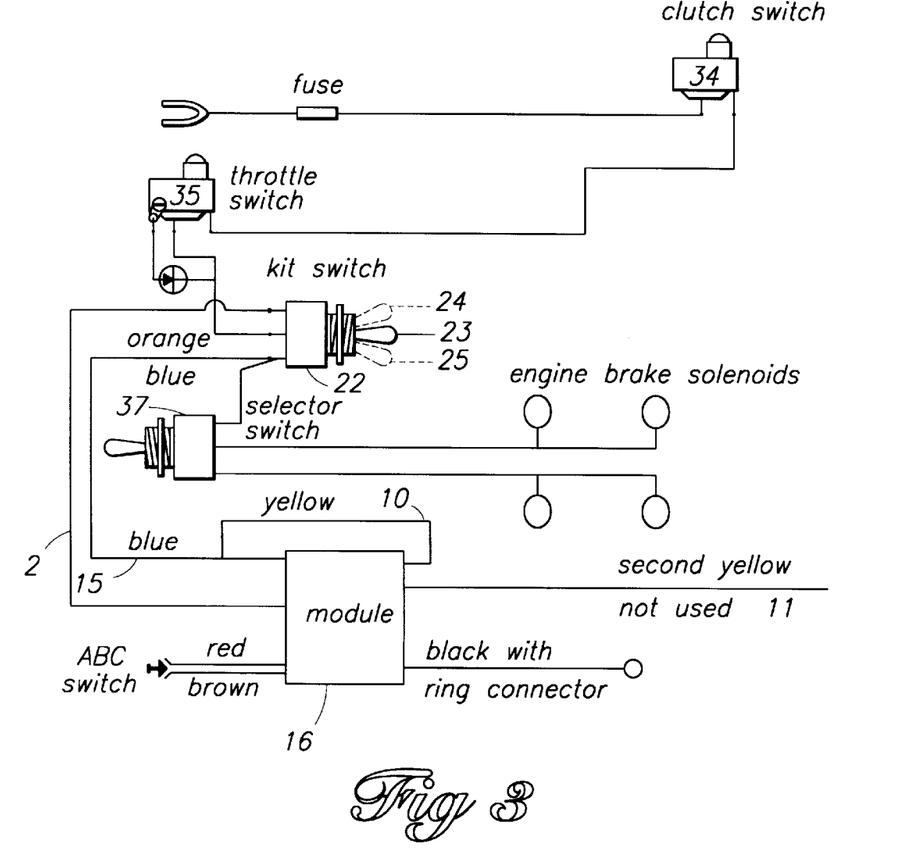
FIG. 3 is a schematic illustrating the invention and shows the control module connected to a jake brake control system that has a pre-existing selector switch that sets different braking levels.
Figure 10:
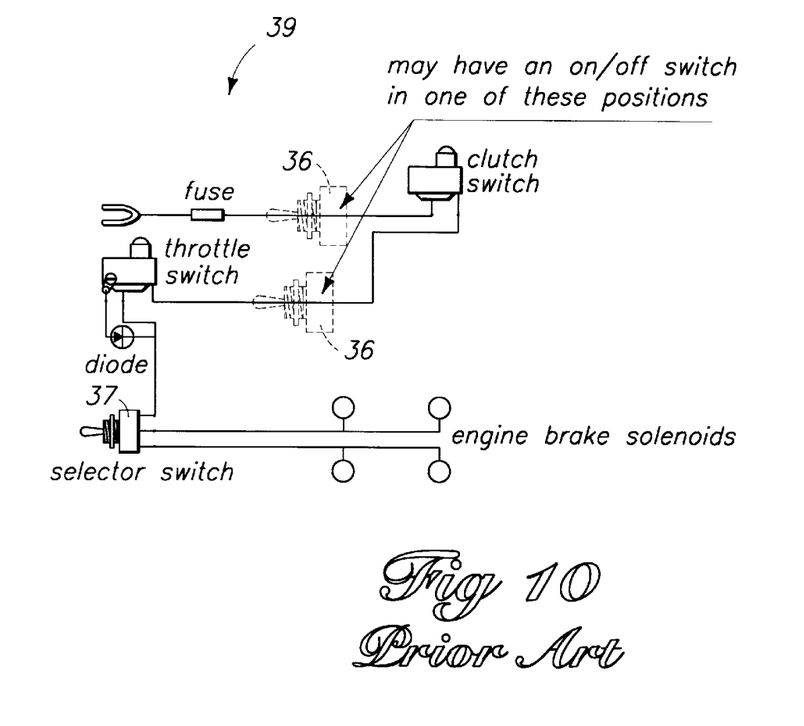
FIG. 10 is a schematic illustrative of the prior art, but shows a system having a three-position brake level selector switch.

FIG. 10 shows an alternative prior art system 39 before the invention is installed, where a preexisting, three-position brake level selector switch 37 is connected in series with the dashboard-mounted switch 36, the clutch switch 34, and the throttle switch 35. FIG. 3 shows the installation of the present invention into this system. In this system, the invention functions exactly as described above, except with the added option of being able to select the braking level with selector switch 37. The three-position switch 22 is placed in series before the selector switch 37. As before, the control module 16 is then connected in parallel with the three-position switch 22 by leads 2 and 15, with lead 10 connected directly to lead 15. Again, lead 11 is not used except where the control module 16 is connected to a system having a computer-controlled engine, as is described below.

Figure 8:
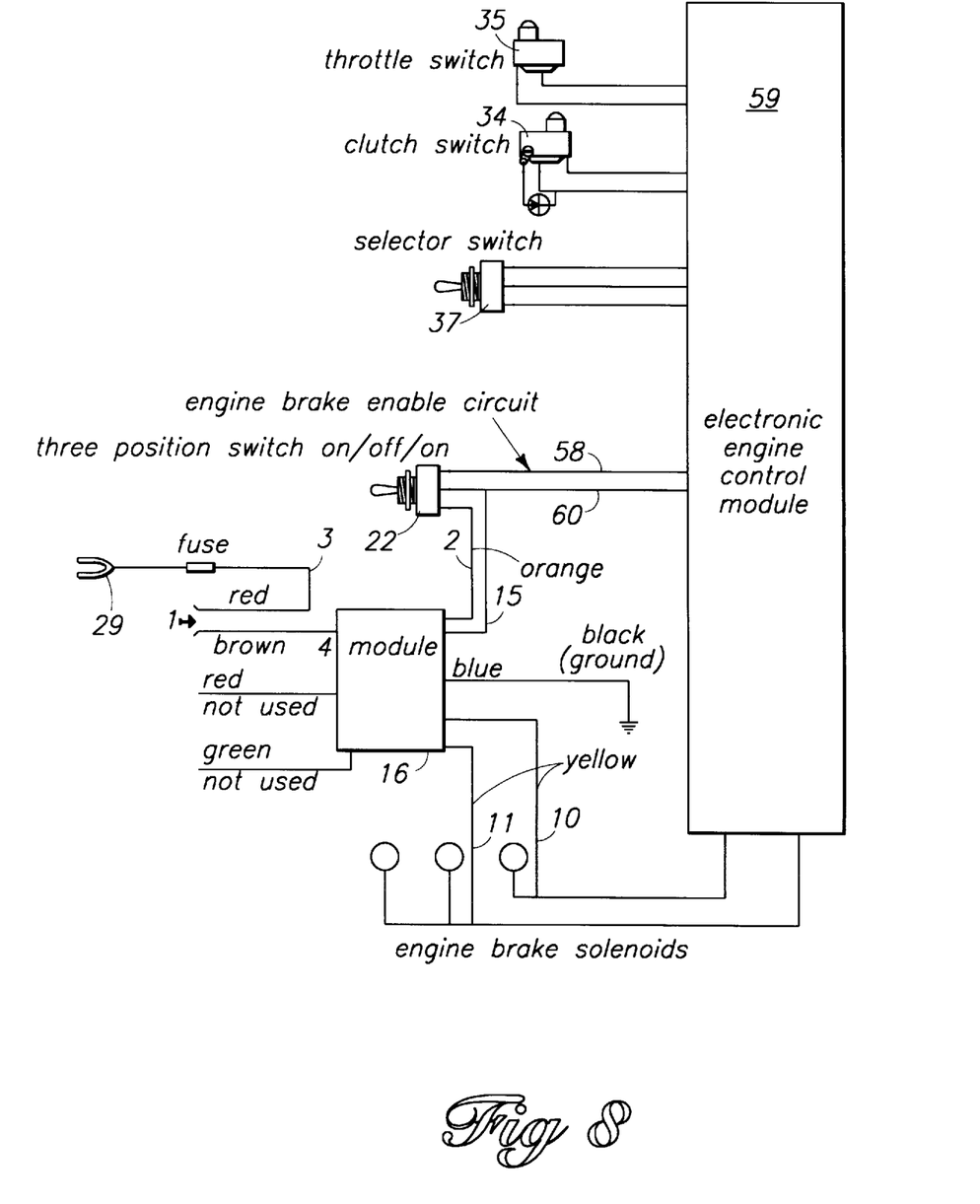
FIG. 8 is a schematic showing the invention connected to a computer-controlled engine system having a pre-existing selector switch.

FIG. 8 shows the invention connected to a system that has a selector switch 37 and a computer-controlled engine. The control module 16 is connected in parallel with the factory-installed electronic engine control module 59 through leads 15 and 2. The system functions exactly as before except that when push-button switch 1 is pressed to turn on the jake brakes, the enable circuit is completed when lead 58 connects to lead 60, through the closing of relay contacts 13 and 15.

Figure 5:
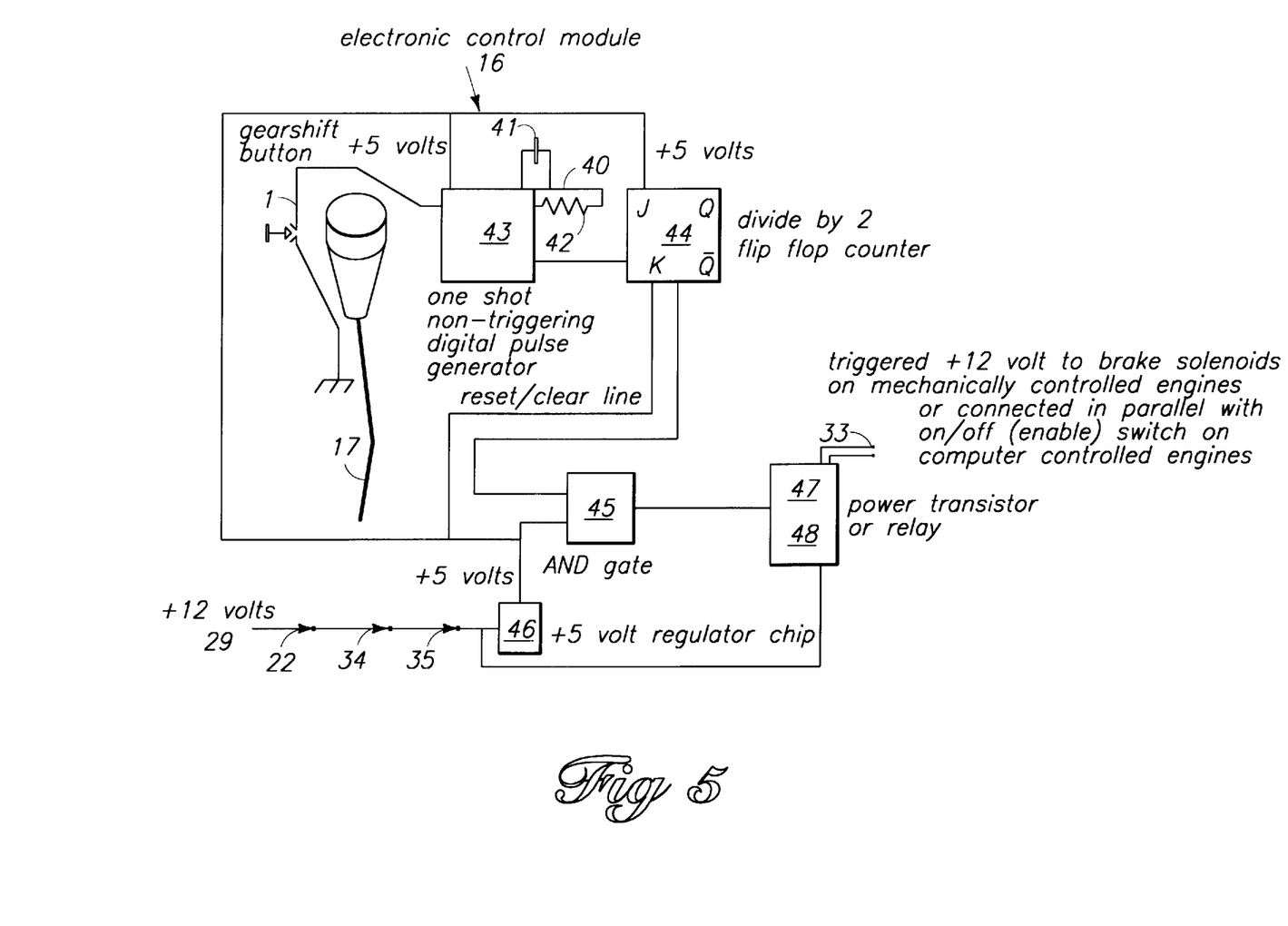
FIG. 5 is a schematic of a second embodiment of the invention, and shows the integrated chip components of a modified control module.
Figure 6:
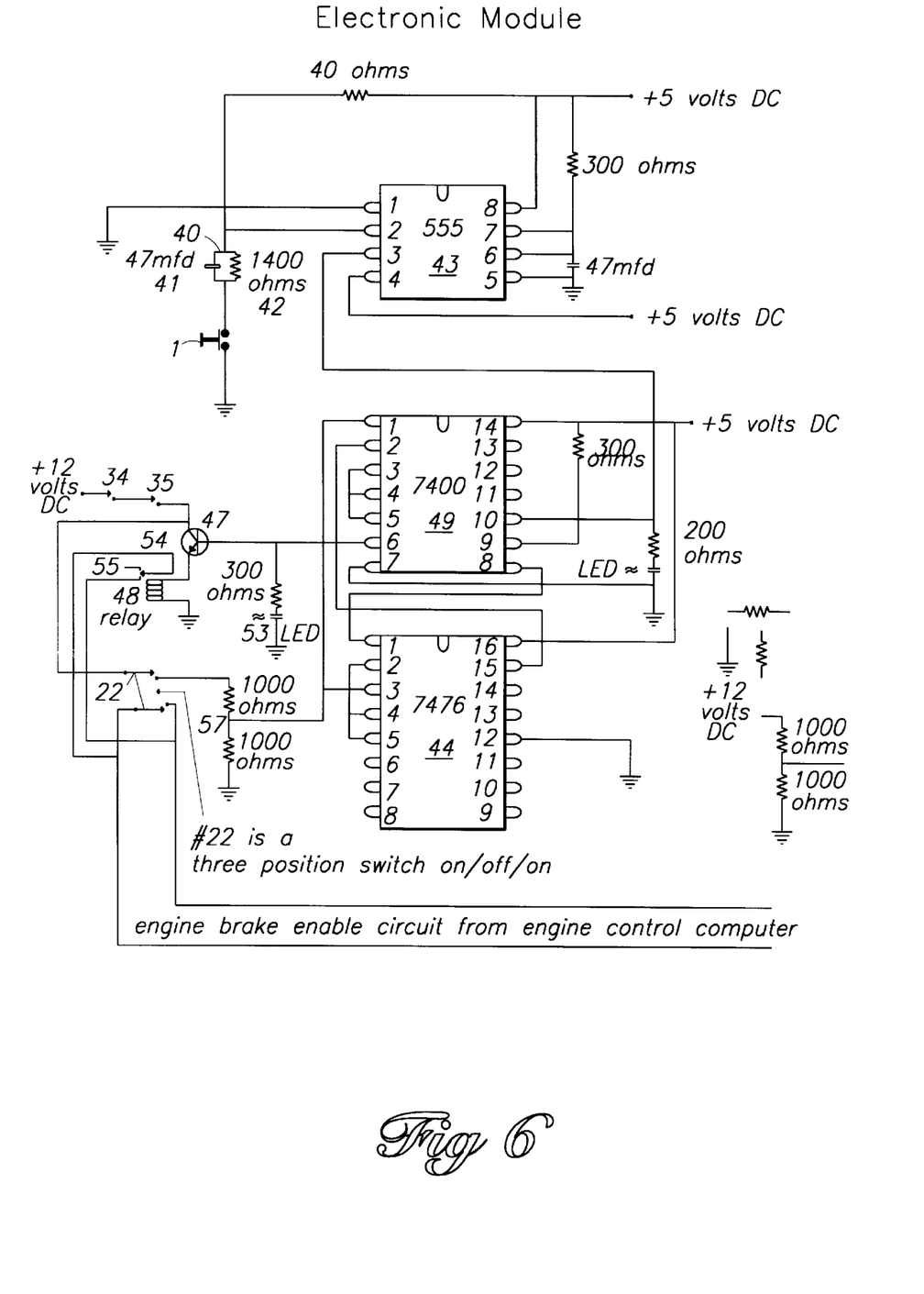
FIG. 6 is a wiring diagram of the second embodiment of the invention shown in FIG. 5 and shows the integrated chips and electrical components utilized in the modified control module.
Figure 7:
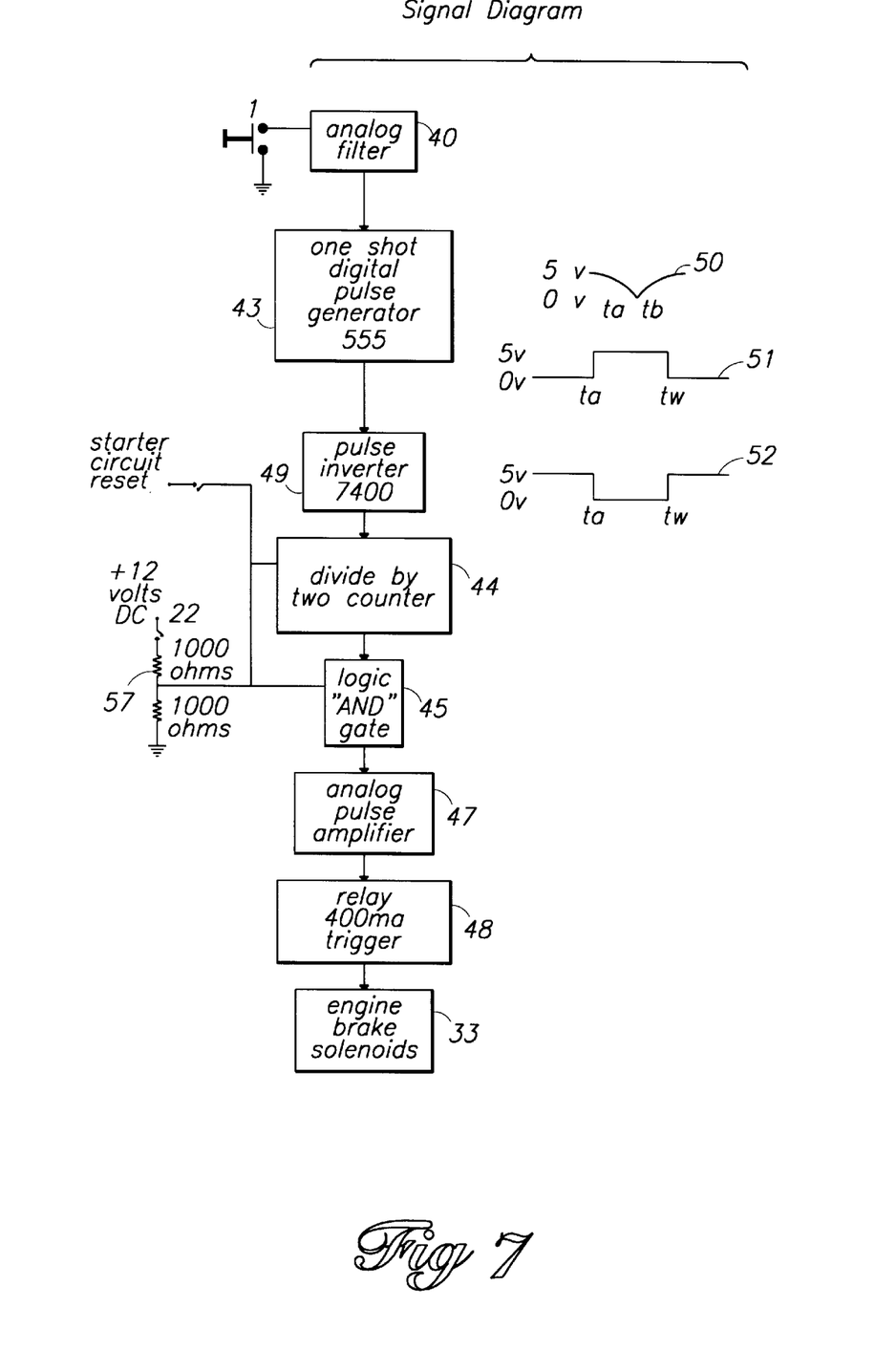
FIG. 7 is a flowchart representing the system shown in FIG. 5 and includes signal diagrams.

The second embodiment of the invention now will be described. This second embodiment functions just like the first embodiment, except that the engine brakes can be turned off as well as on by depressing the gearshift push-button switch 1. Referring now to FIGS. 5–7, the control module 16 now consists of an analog filter 40, 555 IC timer configured as a one-shot non-retriggering digital pulse generator 43, 7400 pulse inverter 49, 7476 J K flip flop configured as a divide-by-two counter 44, logical AND gate 45, +5-volt DC voltage regulator 46, transistor 47, and relay 48. Typically, the invention uses National Semiconductor model serial nos. LM555C for the IC timer 43, DM7400 for the pulse inverter 49, DM7476 for the J K flip flop 44, and Radio Shack model serial no. 276-1770 for the voltage regulator 46. Equivalent models and components from other manufacturers can also be used. The electrical functions and properties of these various components are well known in the art and need not be described further.

Referring to FIGS. 5–7, if the control module 16 is enabled by setting the three-position switch 22 to the "down" position 25, and then the gearshift push-button switch 1 is pressed and released, a signal is sent to the analog filter 40. The filter 40 consists of a parallel combination of a 47 microfarad capacitor 41 and a 1400 ohm resistor 42. The filter 40 triggers the 555 IC timer/pulse generator 43 with a +5-volt "inverse shark fin" pulse 50 of duration 30 milliseconds. The timer/pulse generator 43 then outputs a +5-volt positive-going pulse 51 with a duration of 140 milliseconds. The pulse 51 is then inverted by the 7400 pulse inverter chip 49, resulting in a negative-going pulse 52.

The pulse 52 is then fed into the clock input of the J K flip flop 44, which is a negatively triggered logical device. The resulting output of the flip flop 44 changes state at every negative pulse at its clock input, hence a divide-by-two counter.

The +12-volt DC signal from the battery 29 passes through the voltage divider 57, resulting in a +5-volt DC output. This +5-volt DC output is the supply to the various integrated chips and is also the input to the AND gate 45. The +12-volt DC supply from battery 29 is often very unstable. Therefore, it is preferred to use a +5-volt DC voltage regulator 46 as the power supply.

The +5-volt DC signal from the voltage divider 57 or the voltage regulator 46, and the output of the J K flip flop 44 are logically compared at the AND gate 45. If both signals are positive (+5 volts DC), signifying a request to turn on the jake brakes, then the resulting output is amplified by transistor 47. The output of transistor 47 is fed into relay 48, and relay contacts 54 and 55 then close, thus completing the enable circuit and energizing the engine brake solenoids 33 on computer-controlled engines, or on mechanically controlled engines, +12 volts are supplied through relay 48 to energize the solenoids 33. The LED 53 turns on as well, simulating that the jake brakes are engaged.

If the push-button switch 1 is pressed again to turn off the jake brakes, another pulse 52 will trigger the J K flip flop 44 to change its state (J K flip flop 44 outputs zero volts). The AND gate 45 compares this zero-volt output with the output of the voltage divider 57 or the voltage regulator 46. Since the resulting output of the AND gate 45 would be zero volts, there would be no voltage fed into the transistor 47 and the relay 48, and the jake brakes will turn off. As in the first embodiment, the brakes also can be turned off by returning the three-position switch 22 to the "middle" position or by pressing the clutch or throttle pedals so as to open clutch switch 34 or throttle switch 35. The system is also reset to "off" anytime the engine starter is energized.

If the three-position switch 22 is in the "up" position 24, and then the push-button switch 1 is pressed to turn off the jake brakes, nothing will happen as voltage is kept supplied through lead 2, through the module 16 and then through leads 30, 31, 32 and to the engine brake solenoids 33.

It can be seen that the present invention is less cumbersome to operate than the conventional systems in use today. Because the invention can be instantaneously activated and locked, or deactivated, it makes the jake brakes safer and easier to use when the truck is driven in heavy traffic.

While only two embodiments of the invention have been shown and described in the invention, the preceding description is not intended to limit the scope of what is considered to be the invention. Instead, the scope of the invention is limited solely by the patent claim or claims which follow, the interpretation of which is to be made in accordance with the established doctrines of patent claim interpretation.

What is claimed is:

1. An auxiliary control for an engine compression brake system of a vehicle having a gear shift, comprising:

a finger switch mountable to the gear shift, the finger switch being operable to close a switch contact in an electrical engine compression brake control circuit, the control circuit having at least one other switch serially connected in the control circuit that is operable to deactivate the engine compression brake system;

a solenoid-operated relay electrically connected to the finger switch in a manner such that use of the finger switch to close the switch contact activates the solenoid-operated relay, thereby causing electrical current to be supplied through the engine compression brake system control circuit and activate operation of the engine compression brake system; and a separate power feed delivered to the solenoid-operated relay, the solenoid-operated relay being responsive to electrical current in the control circuit, in a manner so that the solenoid-operated relay remains activated upon subsequent breaking of the switch contact, thereby maintaining activation of the engine compression brake system, and further, a diode serially connected to the power feed, and biased such that the electrical current in the power feed flows only in a direction towards the solenoid-operated relay.

2. The auxiliary control defined in claim 1, wherein the finger switch is of a type that causes closure of the switch contact only so long as an operator continually holds the finger switch, thereby allowing the operator to remove his or her hand from the gear shift to break the switch contact, while concurrently keeping the engine brakes activated.

3. The auxiliary control defined in claim 1, wherein the finger switch closes the switch contact by a switch-pressing action, and the switch contact is broken by a subsequent switch-releasing action, and further, the power feed to the solenoid-activated relay continues until the at least one other switch serially connected in the control circuit is operated to deactivate the engine compression brake system.

4. The auxiliary control defined in claim 1, wherein the finger switch closes the switch contact by a first switch-pressing action, and the switch contact is broken by a subsequent switch-releasing action, and further, the power feed to the solenoid-activated relay continues until at least one of the following two events occurs: (1) at least one other switch serially connected in the control circuit is operated to deactivate the engine compression brake system; or (2) the finger switch is operated to close the switch contact by a second switch-pressing action.

5. An auxiliary control unit for an engine compression brake system of a vehicle, the engine compression brake system being operable when supplied with electrical current, comprising:

a finger switch mountable to a gear shift of the vehicle, the finger switch being operable to close a switch contact;

a logic circuit electrically connected to the finger switch;

a solenoid-operated relay electrically connected to the logic circuit and responsive to the logic circuit in a manner such that a first switch-pressing action of the finger switch closes the switch contact and sends a first electrical signal through the logic circuit, thereby causing the logic circuit to supply an electrical current to the solenoid-operated relay for activation of the engine compression brake system; and further, a second switch-pressing action of the finger switch closes the switch contact and sends a second electrical signal through the logic circuit, thereby causing the logic circuit to restrict electrical current to the solenoid-operated relay for deactivation of the engine compression brake system.

6. The auxiliary control unit of claim 5, wherein the logic circuit comprises a pulse generator electrically connected to a flip-flop, and an AND gate electrically connected to the flip-flop.

* * * * *